July 21, 1931.  H. D. COLMAN  1,815,345
OVERLOAD RELEASE MECHANISM
Original Filed Feb. 5, 1927   2 Sheets-Sheet 1
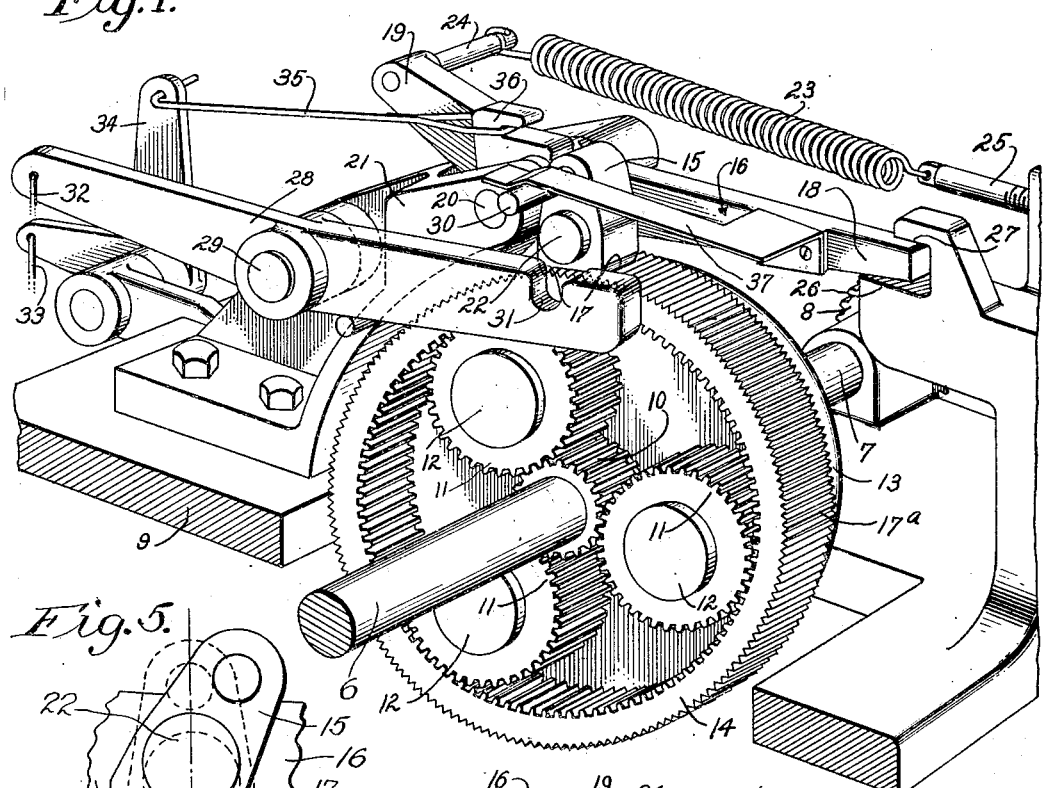
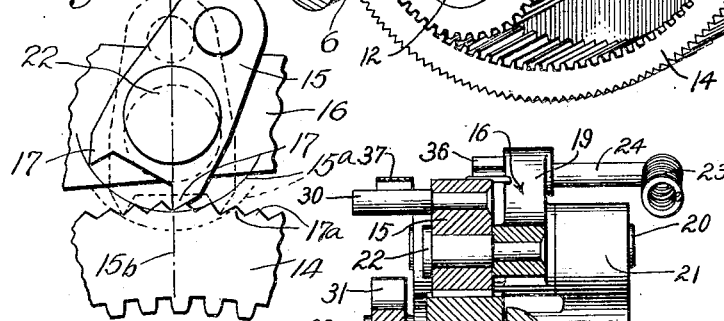
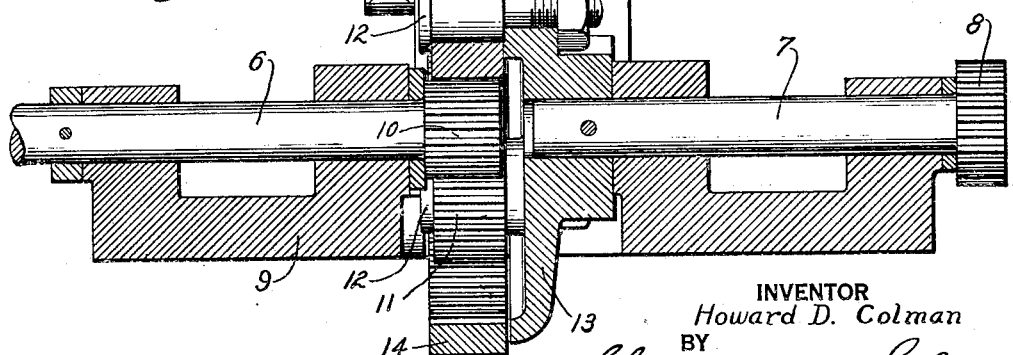
INVENTOR
Howard D. Colman
BY
ATTORNEYS July 21, 1931. H. D. COLMAN 1,815,345
OVERLOAD RELEASE MECHANISM
Original Filed Feb. 5, 1927    2 Sheets-Sheet 2

INVENTOR
Howard D. Colman
BY
ATTORNEYS

Patented July 21, 1931

1,815,345

UNITED STATES PATENT OFFICE

HOWARD D. COLMAN, OF ROCKFORD, ILLINOIS

OVERLOAD RELEASE MECHANISM

Original application filed February 5, 1927, Serial No. 166,086. Divided and this application filed May 31, 1928. Serial No. 281,830.

This invention relates generally to improvements in overload release mechanisms and more particularly to a mechanism for use in a mechanical power transmitting train such as is disclosed in my copending application Serial No. 166,086, filed February 5, 1927, of which this application is a division.

An important object of the present invention is to provide a new and improved overload release mechanism for a power transmitting train which operates practically independent of friction and responds to a predetermined condition of overload regardless of whether the obstructing force causing such condition is applied suddenly or gradually.

Another object is to provide a device responsive to a predetermined torque in a driving train and operable to completely free the driving and driven parts thereby permitting continued operation of the former without the exertion of an actuating force on the latter.

The invention also aims to provide a novel mechanism for reconditioning an overload release device of the above character.

Other objects and advantages of the invention will become apparent from the following detailed description taken in connection with the accompanying drawings, in which Figure 1 is a fragmentary perspective view of a mechanical driving train having associated therewith an overload release device embodying the features of the present invention.

Fig. 2 is a sectional view taken along the plane of line 2—2 of Fig. 3 which is a vertical plane through the shaft shown in Fig. 1.

Fig. 5 is a fragmentary view of the overload release mechanism with the cooperating elements at the point of disengagement.

Figure 3:
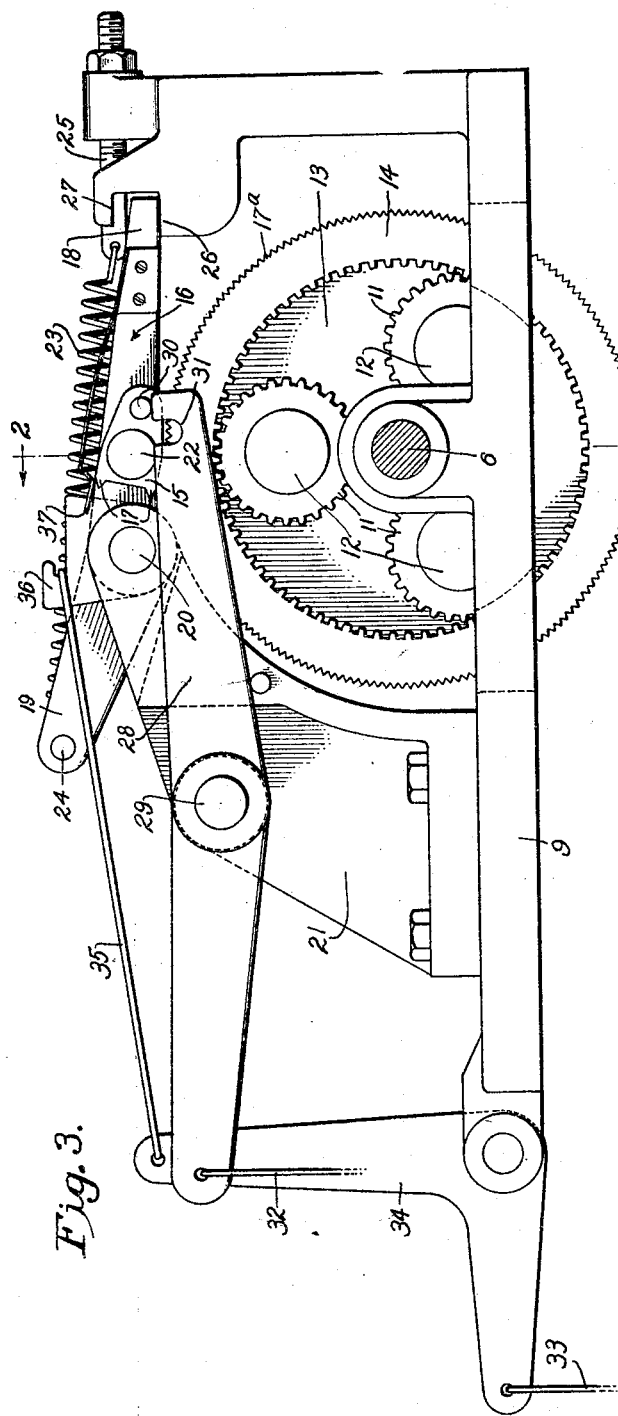
Fig. 3 is a side elevational view of the mechanism shown in Fig. 1.

While the invention is susceptible of various modifications and alternative constructions, I have shown in the drawings and will herein describe in detail the preferred embodiment, but it is to be understood that I do not thereby intend to limit the invention to the specific form disclosed but intend to cover all modifications and alternative constructions falling within the spirit and scope of the invention as expressed in the appended claims.

In the exemplary form shown in the drawings, the invention is embodied in a mechanical driving train for transmitting rotary power, the driving part being the shaft 6 and the driven part being a shaft 7 carrying a pinion 8 for connection with a part to be operated. The shafts are journaled in suitable bearings on a frame 9.

Interposed between the alined shafts is a speed reducing gearing of the planetary type comprising a pinion 10 fixed to the driving shaft 6 and meshing with three spur gears 11 rotatably mounted on annularly spaced flying studs 12 projecting rigidly from a disk 13 which is fixed to the adjacent end of the driven shaft 7. The gears mesh with gear teeth formed internally of a ring 14 and thus serve to floatingly support the ring concentric with the shafts.

The present overload release device involves the use of the differential gear mechanism, advantage being taken, in the present instance, of the differential character of the speed reduction gearing above described. In this gearing, the ring 14 and the disk 13 constitute two members which are driven differentially from the shaft 6. That is to say, if the ring gear 14 is held stationary, rotation of the pinion 10 causes the gears 11 to rotate about their own axes while the gear 14, to permit of such rotation, causes the gears 11 to revolve about its axis, rotary motion being thereby imparted to the disk 13 at a reduced speed. Should the disk 13 be held while the ring is free to rotate, the axes of the gears 11 will remain fixed and rotation of the shaft 6 rotates the gears 11 and therefore the ring 14.

The overload release device proper comprises a mechanism which operates substantially independent of friction to resist and overcome the torque tending to rotate the ring 14 during normal rotation of the shaft 6 in either direction but capable of yielding movement to completely and quickly free the ring when the torque in the driving train exceeds a predetermined magnitude. The torque tending to rotate the ring 14 is, of course, proportional to the load on the driven shaft 7 and increases rapidly when an obstruction is encountered by the part driven from that shaft.

The means for thus rendering the drive shaft 6 ineffectual for operating the disk 13 comprises a holding element in the form of a pivotal detent member or dog 15 which, in the present instance, is mounted on a bell crank lever 16 and yieldably urged as by spring pressure in a radial direction into holding engagement with the gear 14. To provide a holding element that operates practically independent of friction, the dog 15 is constructed with two spaced teeth 17 having intersecting side surfaces forming edges which are located equidistant from the longitudinal center line of the dog and the line of action of the force tending to hold the dog against the gear 14. The teeth 17 enter notches defined by teeth $17^a$ cut in the outer peripheral surface of the gear 14 parallel to the gear axis. A substantially frictionless knife edge engagement is thus provided for.

The bell crank 16 has two arms 18 and 19 projecting in opposite directions from a bearing portion which is pivoted on a pin 20 carried by a standard 21 on the frame 9. On the arm 18 a short distance from the axis of the bell crank there is a laterally projecting pin 22 on which the overload release dog 15 is pivotally mounted intermediate its ends. The dog is thus adapted to swing about its own axis in the plane of the annular gear 14 and is also adapted, by oscillation of the lever 16, for bodily movement in a direction substantially radially of the gear 14 and toward and away from the teeth thereon.

To yieldably urge the dog toward the periphery of the gear 14, with a predetermined force, a spring 23 is employed. Preferably this spring is in the form of a coil which is longitudinally extensible and contractible, one end being secured to a pin 24 projecting laterally from the arm 19, the other end being anchored through the medium of a bolt 25 by which the tension of the spring may be conveniently adjusted.

The spring is disposed with its axis spaced above the pivotal axis of the bell crank, the force exerted thereby acting to swing the bell crank 16 in a direction to carry the axis of the pivotal dog 15 toward the gear 14. This movement of the dog is limited by a stationary stop 26 engaging the end of the bell crank arm 18. A stop 27 arranged to engage the same arm in its upward movement prevents swinging of the bell crank to such a degree as to carry the line of action of the spring beyond the pivotal axis of the bell crank 16.

It will be evident that when the dog 15 is in upright or set position, as shown in Fig. 1, the radially acting force applied thereto by the spring 23 through the bell crank 16 will press the dog against the gear 14 holding the tips of the teeth 17 seated at the roots of the notches between the gear teeth $17^a$. In this condition, the path $15^a$ (Fig. 5), through which the teeth 17 would move about the pivot pin 22, if free to do so, considerably overlaps the fixed arcuate path through which the gear teeth $17^a$ are adapted to move about the gear axis. Thus, when the dog is in set position, the two paths in which the gear teeth $17^a$ and the dog teeth 17 are adapted to move, intersect each other at a point spaced circumferentially of the gear 14 from a radial line $15^b$ through the axes of the gear and dog. By reason of this intersection, the dog teeth 17 act on the sides of engaged gear teeth to resist rotation in either direction. Such rotation can take place only under an overload on the driven shaft 7 of such magnitude that the force exerted by the gear 14 on the dog 15 will have a component acting along the line $15^b$ of a magnitude greater than the force of the spring 23 resisting bodily movement of the pivot pin 22 away from the set position shown in dotted outline in Fig. 5. When such an overload condition occurs, the spring yields allowing the pivotal axis of the dog and therefore the path $15^a$ to shift bodily away from the gear teeth. The result of this action is to allow the gear 14 to move and the tip of the active dog tooth 17 to follow therewith along the fixed path of the gear teeth $17^a$ until the dog tooth reaches "over-center" position, that is at the line $15^b$. In the tilting of the dog, which accompanies its "over-center" movement, the tip of the active dog tooth 17 follows outwardly along the coacting face of the engaged gear tooth and continues to exert a restraining action on the gear. As the tip passes "over-center" (Fig. 5), the path $15^a$ determined by the position of the pivot pin 22 is tangent to the circle defined by the tips of the gear teeth so that the dog can no longer restrain the gear. In swinging beyond its full line position shown in Fig. 5, the dog tooth moves away from the gear teeth, the gear being completely freed. Thereafter the rotational movement of the drive shaft 6 is imparted to the gear 14 and no power is applied to the shaft 7 so long as the dog remains in released position (Fig. 3).

While only one of the paths above referred to need be of arcuate curvature, provided it is convex, both paths are so curved in the present instance. With this arrangement, the control spring 23 is rendered more effective and the "over-center" action more rapid than would be the case where the engaging teeth of one of the coacting elements is mounted for movement in a rectilinear path or one of concave curvature. Through the use of the two spaced teeth 17 on the dog 15, it will be apparent that the overload release device above described operates in either direction of rotation of the shaft 6.

To illustrate this releasing action more in detail, let it be assumed that the springs 23 is tensioned to respond to a predetermined critical load on the driven shaft 7 and that an obstruction exerting a greater load is encountered by the driven shaft in its rotation in either direction. Under these conditions, the opposition offered to the continued rotation of the normally driven differential shaft 7, because of the differential character of the planetary drive, will cause an excessive torque to be exerted by the gear 14 on the dog 15. When the magnitude of this torque exceeds that of the torque exerted by the then active tooth 17, as determined by the direction of rotation of the driving shaft 6, additional power is applied to the other differentially driven element, that is, the gear 14, the movement of which swings the dog 15 away from its normal set position as above described, the bell crank arm 18 swinging upwardly against the action of the spring 23 in order to permit of such pivoting. After the dog passes "over-center", it swings quickly into the released position shown in Fig. 3, the spring 23 acting at this time to move the dog back toward the gear 14 which movement is limited by the stop 26. The dog is thus held with its side surface out of contact with the teeth 17ª of the gear (see Fig. 3).

With the dog 15 thus released, the gear 14 is completely freed for rotation by the driving shaft 6, practically no power being transmitted then to the driven shaft 7. In fact, this latter shaft can be conveniently rotated reversely without effort to permit removal of the obstruction causing the condition of overload.

It should be noted that the overload torque required to initiate the releasing movement of the dog 15 is greater than that required to continue the pivotal movement. This results from the location of the line of action of the spring 23 relatively close to the pivotal axis of the bell crank 16 so that the movement of the spring toward this axis in the pivotal movement of the dog away from its normal set position progressively decreases the length of the moment arm of the force applied by the spring 23. Thus the torque tending to hold the gear 14 against rotation begins to decrease as soon as an opposing torque has been created which is sufficient to start the dog in its movement away from set position. For this reason the overload release is adapted to respond quickly to a predetermined critical torque in the driving train regardless of whether the force exerting such torque is applied suddenly or gradually to the driven shaft.

Another feature of the overload release is that it is not affected materially by friction between the parts. In the present arrangement, a relatively large torque is exerted by the gear 14 tending to release the dog 15; consequently a strong spring 23 is required to hold the gear against rotation. Friction between the bell crank 16 and its pivot therefore constitutes such a small part of the total force holding the gear 14 against rotation that the effect of variations in these friction forces is negligible. The knife-edge type of engagement between the teeth 17 of the dog and the gear 14 reduces to a minimum the friction between the parts whose relative movement controls the releasing action of the mechanism.

It will also be observed that the dog 15 has two released positions into either of which it may be thrown depending on the direction of rotation of the driving shaft 6 when the overload condition is encountered. Since the teeth 17 are spaced equidistant from the center of the dog 15, the mechanism will, in the present instance, respond to an obstructing force of the same magnitude regardless of the direction of rotation of the shaft 6.

Means is provided for resetting the dog 15 after it has been thrown into released position by an obstructing load, this being effected either manually or automatically in the operation of the device connected to the shaft 6. The means herein illustrated for performing this function comprises a lever 28 arranged when actuated to swing the overload release dog from either of its released positions upwardly into holding engagement with the gear 14, as shown in Fig. 1. The lever is pivotally supported intermediate its ends on a stationary pin 29 and thus is adapted to swing in a plane parallel to the dog 15. One of its ends is disposed beneath a pin 30 projecting laterally from the dog 15 at the end thereof opposite the teeth 17. The pin 30 cooperates with a cam notch 31 formed in the upper edge of the lever arm.

Figure 4:
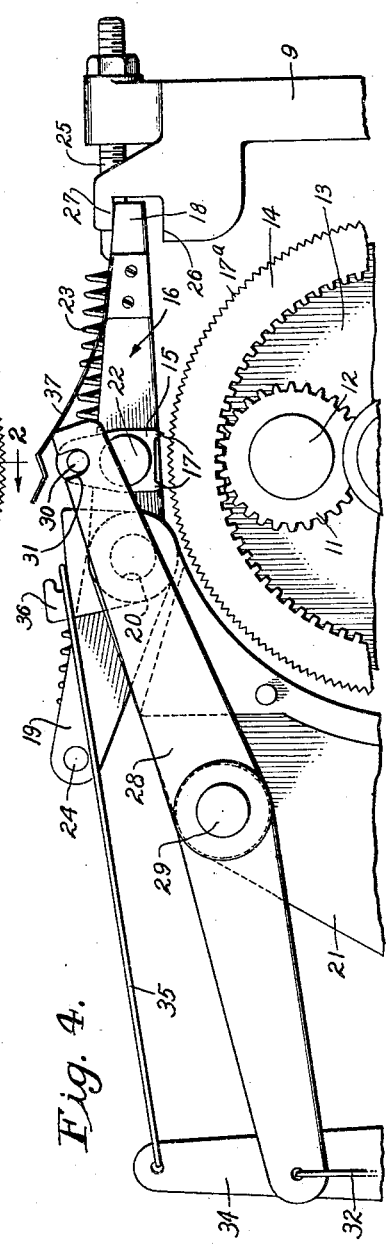
Fig. 4 is a fragmentary view of the same mechanism illustrating a different operative position thereof.

Resetting of the dog is effected, in the present instance, by swinging the notched arm of the lever 28 upwardly as by pulling downwardly on a cord 32 attached to the opposite end of the lever. At the beginning of this movement, the dog 15 is positioned as shown in Fig. 3 with the pin 30 resting on the upper edge of the notched lever arm. In the upward movement of the arm, the tapered end of the dog is carried upwardly, the pin 30 moving along the lever arm and finally entering the notch 31. At the upper limit of this resetting movement, which, as shown in Fig. 4, is determined by the stop 27, the dog is in its normal set position which position is determined by the position of the cam notch 31. Now when the notched end of the lever 28 is lowered, the teeth 17 engage the notches in the periphery of the ring gear and the dog becomes set in the position shown in Fig. 1. In the event that the gear 14 is rotating when resetting is attempted, the notch 31 will prevent throwing of the dog by holding the same against pivotal releasing movement while the gear 14 is being brought to rest.

In the resetting operation, it will be observed that the dog 15 is moved away from the gear a distance sufficient for the teeth 17 to clear the gear teeth 17ª when the dog is in upright position as shown in Fig. 4. Then when the dog is allowed to move back toward the gear 14, its teeth 17 enter the notches between the gear teeth so that the path 15ª again intersects the circle defined by the gear teeth.

It is often desirable to throw the overload release device when the shaft 6 is not running, thereby permitting of operation of the driven shaft 7 by other means. This may be accomplished in the present instance by pulling on a cord 33 which, through the medium of the bell crank 34 and a link 35, oscillates an arm 36 formed integral with the bell crank 16. Forward movement of this arm moves the bell crank 16 in a direction to raise the dog 15 bodily out of engagement with the teeth of the ring gear. The dog is then free to swing about its axis which is effected by a leaf spring 37, the free end of which bears downwardly on the pin 30 eccentrically of the axis of the dog, thereby tipping the dog into released position. The overload release dog can be reset in the usual way by actuating the pull cord 32. The spring 37 is positioned for engagement with the end of the notched arm of the lever 28 as shown in Fig. 4 and therefore acts to start the return of the resetting lever to its inactive position, the notched end of the lever being of such weight that the return movement of the lever is continued by the action of gravity.

I claim as my invention:

1. In a rotary driving mechanism, the combination of a driving member, a driven member, a driving connection between said members including two elements differentially operated from said driving member, one connected to said driven member, the other comprising a ring having a notched peripheral surface, a pivotal dog having spaced teeth for engaging said notches, yieldable means exerting an actuating force acting on said dog in a direction intermediate said teeth to urge the dog toward said peripheral surface whereby to produce torques resisting rotation of said ring in either direction.

2. In a driving mechanism of the character described, the combination of a driving member, a driven member, an element differentially driven from said driving member and normally tending to move in accordance with the operation of said driving member, said element having a toothed surface, and means normally acting to hold said element yieldably against movement comprising a dog mounted on a shiftable pivot and having two spaced teeth located on opposite sides of its longitudinal center line and adapted for engagement with the teeth on said surface, and yieldable means acting in a direction along said center line to press said teeth of the dog into engagement with said toothed surface on said element and prevent shifting of said pivot away from said surface thereby preventing pivoting of said dog in either direction during the normal operation of said driving means but permitting pivotal movement of the dog into released position to free said driven means when an abnormal load is encountered.

3. The combination with a driving means, of two differentially driven members, one of which is to be normally driven by said driving means, overload release means for rendering said driving means ineffectual in driving said normally driven member comprising means providing a toothed surface movable with said other driven member, a rocker member fulcrumed on a fixed axis, a dog pivoted on said rocker member and engaging a tooth of said surface to hold said last mentioned member against rotation, and a spring acting to swing said rocker member in a direction to maintain holding engagement between said dog and said element.

4. The combination with a member to be operated, of driving means therefor, means normally establishing a driving connection between said member and said driving means and operable to render said driving means ineffectual under predetermined load conditions comprising an element tending to move in accordance with the direction of motion of said driving means, and a detent member acting when in a normal set position to hold said element against such movement but adapted to be moved into either of two released positions by said element when a predetermined load is encountered in the operation of said driven member, said detent member when in either of said released positions, freeing said element for movement in the continued operation of said driving means.

5. The combination with a member to be operated, of driving means therefor movable in opposite directions, two elements driven differentially from said driving means, one being connected to said member, the other having a surface which tends to move in accordance with the direction of motion of said driving means, and means normally operating to hold said last mentioned element against movement in either direction but releasable when a predetermined load is encountered in the operation of said other element by said driving means comprising a detent member pivotally mounted on a support which is shiftable toward and away from said surface and yieldable means acting on said support in a direction to urge said detent member into engagement with said surface whereby to exert forces resisting movement of said surface in opposite directions.

6. The combination with a member to be driven, of driving means therefor, an overload release mechanism for rendering said driving means ineffectual comprising a holding dog mounted on a shiftable pivot, an element engaged by said dog and receiving an actuating force from said driving means tending to swing said dog from a normal set position to an over center position during the normal operation of said member, and spring means normally acting to prevent shifting of said pivot relative to said element thereby overcoming the tendency of said element to swing said dog over center, the driving connection between said driving means and said member being maintained so long as said dog remains in said set position.

7. The combination with a device to be operated in opposite directions, of two driven members, means operable to apply a driving force to both of said members, one of said members being connected to said device, a releasable element normally disposed in a set position in which it is operable to hold said other driven member against movement in either direction of movement of said driving means, and means yieldably holding said element in set position but permitting automatic movement thereof into released position when a predetermined load is encountered by said device, said element tending to remain in released position when moved thereto whereby to permanently free said device from said driving means.

8. The combination with a device to be driven, of driving means therefor, means providing a driving connection between said device and said driving means including two rotatable members driven differentially in the operation of said driving means, one of said members being operatively connected to said device, means for holding said other member against rotation so that the power of said driving means will be applied to said device, said holding means comprising an element having a set position in which it is effective to hold said last mentioned member against movement and a released position into which said element is adapted to be moved by said last mentioned member, and spring means acting through said holding element to exert a torque sufficient to maintain the element in set position when said first mentioned member is under normal load.

9. The combination with a device to be operated, of driving means, means adapted to provide an operative connection between said driving means and said device, an overload release mechanism including a releasable member adapted when held in set position to render said connection operative and when moved into released position to permit operation of said driving means independently of said device, means associated with said connecting means and tending to move said releasable member into released position with a force proportional to that required to move said device, and yieldable means acting through said member to exert a force which normally overcomes said last mentioned force and which decreases as said releasable member moves away from its set position.

10. The combination with a device to be operated, of means for driving said device, means adapted to provide an operative connection between said means and said device including an element operable to maintain said connection operative when held against movement, a rocker member pivoted on a fixed axis, a detent member carried by said rocker member and acting to hold said element against movement when in set position and to free said element for independent movement when moved into released position, and a spring acting on said rocker member to hold said detent member in set position, said spring being positioned so that its line of action is shifted toward the axis of the said rocker member as the detent member moves away from set position.

11. The combination with a device to be operated, of driving means, a connection for transmitting power from said driving means to said device including an element tending to rotate with a torque proportional to that required to operate said device, releasable means acting to hold said element against rotation, and spring means operating on said releasable means, said spring means being tensioned to produce a torque which normally overcomes the torque exerted by said element and which decreases progressively in the movement of said releasable means from set position toward released position.

12. The combination with a member to be operated, of driving means therefor, means providing a releasable driving connection between said driving means and said member including a pivotal holding dog normally held in centered position to maintain said connection and adapted to be swung over center in either direction to release said connection, and cam means operable to swing said dog from either of its over center positions back into set position in a relative movement between the dog and the cam means.

13. The combination with a member to be operated, of driving means therefor, means providing a releasable driving connection between said driving means and said member including a detent normally held in a set position to maintain said connection and adapted to be moved into a released position to render said connection inoperative, cam means adapted to reset said detent, and means for effecting relative movement between said cam and said detent to cause resetting of the detent.

14. The combination with a member to be operated, of driving means therefor, means providing a releasable driving connection between said driving means and said member including a detent normally held in a set position to maintain said connection and adapted to be moved into a released position to render said connection inoperative, cam means adapted to reset said detent, means for effecting relative movement between said cam and said detent to cause resetting of the detent, and means for returning said last mentioned means to normal inactive position.

15. The combination with a member to be operated, of driving means therefor, means providing a releasable driving connection between said driving means and said member including a pivotal holding dog adapted to be swung from a normal set position into a released position to render said connection inoperative when an abnormal load is encountered in the operation of said member, and cam means adapted to reset said dog.

16. The combination with a member to be driven, of driving means therefor, means providing a releasable driving connection between said driving means and said member including an element normally tending to move in the operation of said driving means and operable when held against movement to maintain said connection, a detent urged into engagement with said element and normally overcoming the tendency of said element to move but adapted for movement into a released position by said element when a condition of overload is encountered by said member, means by which said detent may be withdrawn from its engagement with said element, and means for moving said detent into released position when so withdrawn.

17. The combination with a device to be operated of a power driving means, two rotatable members driven differentially from said driving means, one of said members being connected to said device so that the latter is moved by the driving means when said other driven member is held against rotation, a releasable element normally maintained in a set position and acting to hold said second member against rotation, means normally acting to hold said member in set position with a predetermined force but adapted when said force is overcome to yield and thereby allow said element to be thrown into a released position by said second member, said element remaining in released position and thereby freeing said device from said driving means during the subsequent operation of the latter, and resetting means for said element normally maintained out of operative association therewith and adapted when actuated with the element in released position to move into operative engagement with the element to restore the element to set position.

18. The combination with a device to be operated and a rotatable driving means therefor, of an overload release mechanism comprising two interengageable elements adapted when engaged to maintain said connection and when disengaged to free the connection and move relative to each other under the action of said driving means, one of said elements having a tooth adapted for movement in an arcuate path, the other element having a cooperating tooth adapted for movement in a path extending along said first mentioned path, said teeth engaging each other at a predetermined point of intersection of said paths when said elements are in normal set position and tending to move in unison along a fixed one of said paths under the action of said driving means, means supporting one of said elements for bodily separation from said other element to permit relative shifting of said paths to a point of tangency, yieldable means normally acting to restrain said elements against bodily separation and thereby hold said elements in said set position until a condition of overload is encountered by said device and then to yield and permit said teeth to follow along said fixed path and disengage at said point of tangency of the paths.

19. The combination of a driving member and a member to be driven thereby of a mechanism acting to maintain a driving connection between said members until the development of a predetermined torque in said connection and then to free said connection, said mechanism comprising a torque-responsive element tending to move in a fixed path, a holding element having a part adapted to interengage with said torque-responsive element, means for supporting the holding element to permit said interengaging part to move along said fixed path together with the torque-responsive part through a predetermined distance only and then in a direction away from said path thereby causing disengagement of said elements, and yieldable means normally acting with a predetermined resisting force to restrain said two elements against movement along said fixed path.

20. The combination of a driving member and a member to be driven thereby of a mechanism acting to maintain a driving connection between said members until the development of a predetermined torque in said connection and then to free said connection, said mechanism comprising an element having a tooth arranged for movement in a fixed path, a second element comprising a dog mounted to swing about an axis disposed transversely of and shiftable toward and away from said fixed path, and spring means normally acting to shift said axis toward said fixed path and maintain said dog in set position in which the dog engages said tooth at a point more remote from said axis than the perpendicular distance between said axis and said path, said spring means thereby acting to restrain said toothed element against movement relative to said axis until a condition of overload is encountered by said driven member and then to permit a combined pivotal and bodily movement of said dog into an overcenter position thereby freeing said tooth.

21. The combination with a member to be driven and driving means therefor, of means providing a releasable driving connection between said member and said driving means including a rotatable element adapted when held stationary to maintain said driving connection, a dog having a normal set position in engagement with said element for holding it against rotation, spring means acting upon said dog to maintain it in its said set position, said spring means being adapted to yield and permit the dog to move into a released position, and a stop operable upon the movement of said dog into said released position to limit movement thereof by said spring means whereby to prevent the dog from being pressed against said rotatable element.

22. In a power transmitting mechanism having rotatable driving and driven members, means providing a driving connection between said members including a rotatable element, adapted when held against rotation to maintain said connection and when permitted to rotate to render said connection ineffectual, and a single spring pressed dog having a normal set position relative to said element and operable in response to torque applied to said element in either direction to move into either of two released positions so as to free said element for rotation by said driving means, said dog being movable from its normal set position into either of said released positions when the torque between said members increases above a predetermined point.

23. The combination with a member to be driven and driving means therefor, of means providing a releasable driving connection between said member and said driving means including a rotatable element adapted when held stationary to maintain said driving connection, said rotatable element having a plurality of teeth arranged in circular series, a dog having a normal set position in engagement with certain of said teeth for holding the element against rotation, means yieldably holding said dog in engagement with said teeth but adapted to permit the dog to move into released position when the torque between said driving and driven members increases above a predetermined point, and manually operable means for restoring said dog into interengaging relation with the teeth of said rotatable element in all positions of the element.

In testimony whereof, I have hereunto affixed my signature.

HOWARD D. COLMAN